Figure 1:
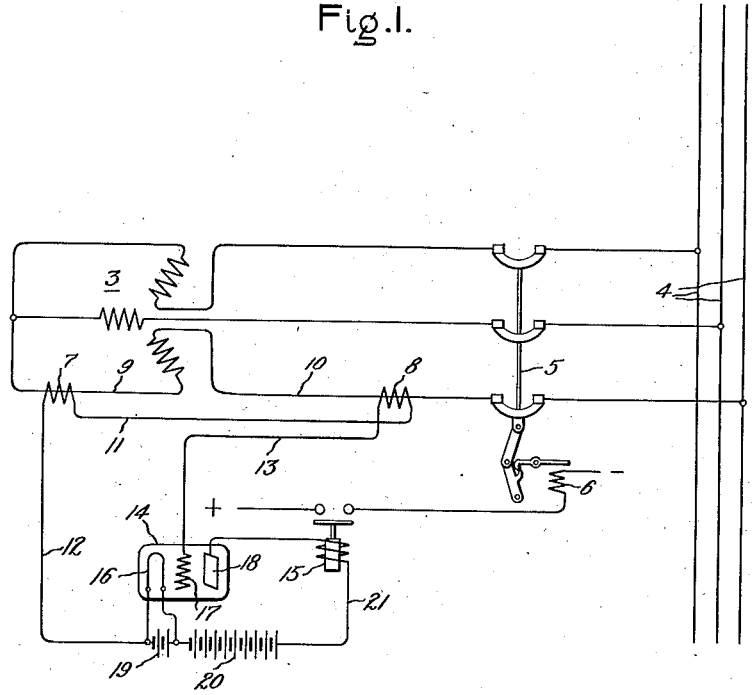

May 27, 1930.    W. BRÜCKEL    1,760,541
PROTECTIVE ARRANGEMENT
Filed March 30, 1926

Inventor:
Waldemar Brückel,
by *Alexander S...*
His Attorney.

Patented May 27, 1930

1,760,541

UNITED STATES PATENT OFFICE

WALDEMAR BRÜCKEL, OF BERLIN, GERMANY, ASSIGNOR TO GENERAL ELECTRIC COMPANY, A CORPORATION OF NEW YORK

PROTECTIVE ARRANGEMENT

Application filed March 30, 1926, Serial No. 98,586, and in Germany May 25, 1925.

My invention relates to improvements in protective arrangements for electric systems and parts thereof and more particularly to the differential protection of any part of an electric system, such as machines, transformers, distribution or transmission lines and the like and an object of my invention is to provide an improved protective arrangement for insuring reliable and sensitive operation on the occurrence of abnormal circuit conditions.

Differential protection, as is well known, is based on the fact that the difference between corresponding electric quantities, such as the currents at two points of an electric system between which there is normally no leakage, that is, to ground or between conductors, is rendered effective in an indicating or controlling device in such a manner that operation thereof is caused only when leakage between these points occurs. It is of course desirable that the device should function correctly irrespective of the system load currents and be sensitive to the smallest current due to a fault. Moreover, the protective arrangement should not be damaged and its proper operation should not be affected on the occurrence of a fault irrespective of its severity or location. It is particularly important in the differential protection of machines with connected conductors or cables that an indication be given when the insulation is beginning to fail in order to avoid more serious disturbances. When current transformers with magnetic cores are used, one on each side of the apparatus or portion of the system to be protected, differences between the transformer characteristics even though slight under normal conditions become greatly accentuated under some conditions especially short circuit and may cause such erroneous functioning of the protective apparatus as to interrupt continuity of service on sound portions of the system.

In view of these difficulties, instead of including the cables connected to the machine or apparatus in the differential protection, there has been proposed a special differential current transformer having two similar primary windings connected one at the beginning and the other at the end of each phase winding respectively. In this case only the vectorial difference between the two primary currents has a magnetizing effect on the iron core of the current transformer to the secondary winding of which the indicating or controlling devices are connected. In such an arrangement, the relays required for adequate protection are usually very sensitive to vibration. Moreover, there is the disadvantage that it can be used for the differential protection of only a machine, transformer or the like but not for more extensive portions of a system such as sections of lines.

In accordance with my invention instead of employing the usual iron or magnetic core current transformers, I obtain satisfactory operation by the use of non-magnetic core transformers and compensate for the lack of magnetic or electric energy available for operating the relay by the intermediate connection of a suitable amplifier arrangement. This arrangement may comprise amplifier tubes in the usual amplifier connection for alternating current relays or in the direction amplifier connection for operating continuous current relays. The tubes themselves may be of the pure electron discharge or vapor discharge types. By using non-magnetic core transformers, it is possible to balance or match the individual transformers very exactly and the balance, once obtained, is not disturbed even with the greatest currents. The intermediate connection of the amplifier tubes is also favorable since the tubes inherently limit the current and thereby keep excess currents from the relay. With direction amplifiers, there may be used polarized relays which operate reliably and definitely on a small amount of energy. In order to avoid electromagnetic and electrostatic influences, the lines leading from the transformers to the control circuit of the amplifier arrangement should be separated or shielded as by an earthed metal sheath or both may be done. This also applies to the amplifier arrangement itself so as to eliminate any tendency it may have to function on account of its sensitiveness to external electrostatic or electromagnetic fields.

My invention will be better understood from the following description, taken in connection with the accompanying drawing, and its scope will be pointed out in the appended claims.

Figure 2:
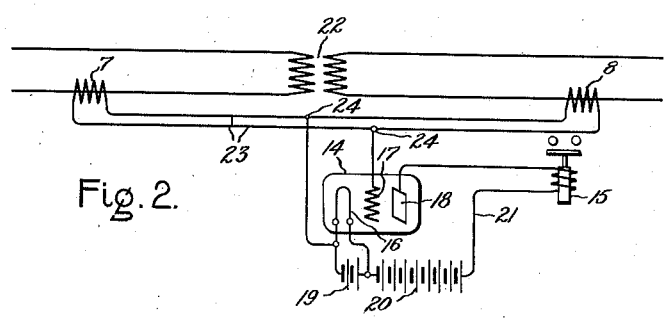

In the accompanying drawing, Fig. 1 illustrates diagrammatically a protective arrangement embodying my invention, and Fig. 2 illustrates diagrammatically another embodiment of my invention.

In Fig. 1, I have shown for purposes of illustration a portion of an electric system comprising a three-phase generator 3 which is arranged to be connected to a bus 4 by suitable circuit controlling means 5 having a trip coil 6. For protecting the generator 3 on the occurrence of abnormal conditions or faults thereon, I have shown, applied to only one phase for clearness, a differential protective arrangement embodying my invention. This arrangement comprises non-magnetic core transformers 7 and 8, one at each of two points of the system of which the generator is a part, arranged to be energized from the system. By non-magnetic core transformers, I mean transformers built without iron cores and having for example an air core. These transformers may be series or current transformers having their primaries connected in the leads or conductors 9 and 10 from opposite sides of one phase winding of the generator 3. The secondaries of the transformers are connected in a circuit comprising the conductors 11, 12 and 13 to produce an effect dependent on the difference between the energizations of the transformers. For amplifying this effect, I provide in accordance with my invention an electron discharge means 14 connected and arranged to be controlled in accordance with the effect. For indicating a fault on the generator 3 or controlling the circuit breaker 5 on the occurrence of a fault, I provide electroresponsive means, such as a relay 15, which is arranged to be controlled by the electron discharge means 14 and when energized by current in excess of a predetermined value, for example, to complete the circuit of the trip coil 6.

The electron discharge means 14 may be of the thermionic type and is herein illustrated as a triode or three element tube comprising a glow cathode or filament 16, a controlling grid 17 and an anode or plate 18. Suitable sources of filament and plate potentials, such as batteries 19 and 20 respectviely, are provided and a source of grid bias potential may also be provided when necessary.

In Fig. 1 the transformers 7 and 8 have their secondaries connected for normally opposing electromotive forces in an auxiliary circuit including the conductors 11, 12 and 13 and the grid 17 so that the grid circuit is energized in accordance with the difference between the currents in the generator leads 9 and 10 at the points where the transformers are connected. Consequently as long as the currents at these points are substantially equal, the potential of the grid 17 with respect to the filament 16 is substantially zero. When, however, a fault such as a short circuit or ground occurs on the system between the points at which the transformers 7 and 8 are located, the grid-filament potential attains a value dependent on the vectorial difference between the energizations of the transformers, that is on the severity of the fault. This differential effect is reflected in the tube and as amplified appears in the plate circuit 21 which includes the winding of the relay 15. This is thereby energized and completes the circuit of the trip coil 6. For faults on other parts of the system the electromotive forces of the secondaries of the transformers 7 and 8 are substantially equal and the relay 15 remains inactive since with substantially zero grid-filament potential the plate current is insufficient to actuate the relay 15. A grid bias battery may be used to prevent any current flownig under normal conditions.

In Fig. 2 I have illustrated an embodiment of my invention as applied to a portion of an electric system including a power transformer 22. In this case the transformers 7 and 8 are constructed with such turn ratios relative to the turn ratio of the power transformer as to produce substantially equal secondary electromotive forces when the currents at the points where the transformers are located are equal. The secondaries of the transformers 7 and 8 are connected in a circuit 23 for normally circulating currents or cumulative electromotive forces. The grid-filament circuit of the tube 14 is connected across normally equipotential points 24 of the transformer secondary circuit. Consequently so long as the vectorial difference between the currents at the points where the current transformers 7 and 8 are located is substantially zero, the potential of the grid 17 with respect to the filament 16 is substantially zero. On the occurrence of a fault such as a short circuit or ground between the points where the transformers 7 and 8 are located, the points 24 cease to have the same potential and their potential difference appearing in the grid-filament circuit is reflected in the tube and as amplified appears in the plate circuit 21 which includes the winding of the relay 15. Consequently operation of the relay 15 is effected.

While I have shown and described my invention in considerable detail, I do not desire to be limited to the exact arrangements shown, but seek to cover in the appended claims all those modifications and applications that fall within the true spirit and scope of my invention.

What I claim as new and desire to secure by Letters Patent of the United States, is:—

1. A protective arrangement for an electric system including non-magnetic core transformers, one at each of two points of the system connected to be energized in accordance with the currents at the points, a thermionic device having a controlling grid and an auxiliary circuit including the secondaries of the transformers and said grid so connected and arranged as to energize the grid circuit in accordance with the difference between the currents at the two points of the system.

2. A protective arrangement for an electric system including non-magnetic core transformers, one at each of two points of the system connected to be energized in accordance with the currents at the points, a thermionic device having a controlling grid, an auxiliary circuit including the secondaries of the transformers and said grid so connected and arranged as to energize the grid circuit in accordance with the difference between the currents at the two points of the system, and a relay having a winding connected in the plate circuit of said device.

3. A protective arrangement for an electric system including non-magnetic core transformers, one at each of two points of the system connected to be energized in accordance with the currents at the points, the secondaries of the transformers being connected in a circuit to produce an effect dependent on the difference between the currents at the two points, and electron discharge means for amplifying the energy due to the difference between the currents connected and arranged to be controlled in accordance therewith.

4. A protective arrangement for an electric system including non-magnetic core transformers, one at each of two points of the system connected to be energized in accordance with the currents at the points, the secondaries of the transformers being connected in a circuit to produce an effect dependent on the difference between the currents at the two points, electron discharge means for amplifying the energy due to the difference between the currents connected and arranged to be controlled in accordance therewith, and a relay arranged to be controlled by the electron discharge means.

5. A protective arrangement for an electric system including non-magnetic core transformers, one at each of two points of the system connected to be energized therefrom, the secondaries of the transformers being connected in a circuit to produce an effect dependent on the difference between their energizations, and electron discharge means for amplifying such effect connected and arranged to be controlled in accordance therewith.

6. A protective arrangement for an electric system including non-magnetic core transformers, one at each of two points of the system connected to be energized therefrom, the secondaries of the transformers being connected in a circuit to produce an effect dependent on the difference between their energizations, electron discharge means for amplifying such effect connected and arranged to be controlled in accordance therewith, and electroresponsive means arranged to be controlled by the electron discharge means.

7. A differential protective arrangement for an electric system including non-magnetic core transformers, one at each of two points of the system connected to be energized in accordance with the currents at the points, a thermionic device having a controlling grid, and an auxiliary circuit including said grid and the secondaries of the transformers connected for normally opposing electromotive forces.

8. A differential protective arrangement for an electric system including non-magnetic core transformers, one at each of two points of the system connected to be energized in accordance with the currents at the points, a thermionic device having a controlling grid, and an auxiliary circuit including said grid and the secondaries of the transformers connected for normally opposing electromotive forces, and circuit controlling means including a relay having a winding connected in the plate circuit of said device.

9. An electric system including a plurality of non-magnetic core transformers connected to produce an effect dependent on the difference between the energy at different points of the system, means for amplifying such effect, and means controlled by said amplifying means.

In witness whereof, I have hereunto set my hand this second day of March, 1926.

WALDEMAR BRÜCKEL.